(12) United States Patent
Sun et al.

(10) Patent No.: US 8,919,099 B2
(45) Date of Patent: Dec. 30, 2014

(54) SYSTEM AND METHOD FOR DETERMINING AN AMMONIA GENERATION RATE IN A THREE-WAY CATALYST

(75) Inventors: Min Sun, Troy, MI (US); Kevin L. Perry, Fraser, MI (US); Chang H. Kim, Rochester, MI (US)

(73) Assignee: GM Global Technology Operations LLC

( * ) Notice: Subject to any disclaimer, the term of this patent is extended or adjusted under 35 U.S.C. 154(b) by 729 days.

(21) Appl. No.: 13/157,669

(22) Filed: Jun. 10, 2011

(65) Prior Publication Data
US 2012/0311998 A1  Dec. 13, 2012

(51) Int. Cl.
| | | |
|---|---|---|
| *F01N 3/00* | (2006.01) | |
| *F01N 3/20* | (2006.01) | |
| *F02D 41/02* | (2006.01) | |
| *F02D 41/14* | (2006.01) | |

(52) U.S. Cl.
CPC .......... *F01N 3/2073* (2013.01); *F02D 41/0235* (2013.01); *F02D 41/1446* (2013.01); *F02D 2041/1433* (2013.01); *F02D 2041/1469* (2013.01); *Y02T 10/22* (2013.01)
USPC ................... 60/285; 60/295; 60/286; 60/301; 60/274

(58) Field of Classification Search
CPC ............. F01N 3/10; F01N 3/08; F01N 3/208; F01N 3/2066; F01N 3/0842; F01N 11/00; F01N 2900/1622; Y02T 10/24; Y02T 10/20; Y02T 10/22; Y02T 10/18
USPC ............................ 60/274, 285, 286, 295, 301
See application file for complete search history.

(56) References Cited

U.S. PATENT DOCUMENTS

| | | | |
|---|---|---|---|
| 5,021,227 A | 6/1991 | Kobayashi et al. | |
| 5,746,052 A * | 5/1998 | Kinugasa et al. | ............... 60/274 |
| 5,778,667 A | 7/1998 | Kinugasa et al. | |
| 5,782,087 A * | 7/1998 | Kinugasa et al. | ............... 60/276 |
| 6,109,024 A * | 8/2000 | Kinugasa et al. | ............... 60/285 |
| 6,119,452 A * | 9/2000 | Kinugasa et al. | ............... 60/285 |
| 6,345,496 B1 * | 2/2002 | Fuwa et al. | ..................... 60/274 |
| 6,662,552 B1 * | 12/2003 | Gunther et al. | ................. 60/286 |
| 6,775,623 B2 | 8/2004 | Ali et al. | |
| 7,472,545 B2 | 1/2009 | Hemingway et al. | |

(Continued)

FOREIGN PATENT DOCUMENTS

| | | |
|---|---|---|
| CN | 101929374 A | 12/2010 |
| DE | 10041891 A1 | 4/2001 |

(Continued)

OTHER PUBLICATIONS

Office Action dated Oct. 18, 2013 from the German Patent Office for German Patent Application No. 10 2012 209 469.5; 7 pages.

*Primary Examiner* — Thomas Denion
*Assistant Examiner* — Patrick Maines (57) ABSTRACT

A system according to the principles of the present disclosure includes a rate determination module, a storage level determination module, and an air/fuel ratio control module. The rate determination module determines an ammonia generation rate in a three-way catalyst based on a reaction efficiency and a reactant level. The storage level determination module determines an ammonia storage level in a selective catalytic reduction (SCR) catalyst positioned downstream from the three-way catalyst based on the ammonia generation rate. The air/fuel ratio control module controls an air/fuel ratio of an engine based on the ammonia storage level.

21 Claims, 4 Drawing Sheets

(56) References Cited

U.S. PATENT DOCUMENTS

| | | |
|---|---|---|
| 7,673,444 B2 | 3/2010 | Yano et al. |
| 8,041,498 B2 | 10/2011 | Brown et al. |
| 8,393,140 B2 | 3/2013 | Perry et al. |
| 2002/0069640 A1 | 6/2002 | Irisawa et al. |
| 2007/0033928 A1* | 2/2007 | Hu et al. .................. 60/286 |
| 2007/0137182 A1 | 6/2007 | Driscoll |
| 2007/0175208 A1* | 8/2007 | Bandl-Konrad et al. ....... 60/286 |
| 2007/0271908 A1* | 11/2007 | Hemingway et al. ........... 60/286 |
| 2010/0043402 A1* | 2/2010 | Perry et al. ..................... 60/285 |
| 2010/0057328 A1* | 3/2010 | Brown et al. ................. 701/103 |
| 2010/0071347 A1* | 3/2010 | Yoshida et al. ................ 60/276 |
| 2010/0107605 A1* | 5/2010 | Brinkman et al. .............. 60/274 |
| 2010/0107606 A1* | 5/2010 | Narayanaswamy et al. .... 60/274 |
| 2010/0111794 A1* | 5/2010 | Katoh ....................... 423/239.1 |
| 2010/0326052 A1* | 12/2010 | Sun ................................. 60/274 |
| 2012/0167553 A1* | 7/2012 | Qi et al. ......................... 60/274 |
| 2012/0180558 A1* | 7/2012 | Li et al. ....................... 73/114.75 |
| 2012/0222406 A1* | 9/2012 | Sakurai et al. ................. 60/276 |
| 2012/0316754 A1* | 12/2012 | Narayanaswamy et al. .. 701/103 |
| 2013/0025261 A1 | 1/2013 | Sun et al. |
| 2013/0095002 A1* | 4/2013 | In et al. ........................ 422/169 |
| 2013/0311065 A1* | 11/2013 | Sun et al. ...................... 701/104 |
| 2014/0013725 A1* | 1/2014 | Sun et al. ........................ 60/274 |

FOREIGN PATENT DOCUMENTS

| | | | |
|---|---|---|---|
| DE | 10041891 A1 * | 4/2001 | ............ B01D 53/88 |
| DE | 102009054046 A1 | 9/2010 | |
| EP | 1061244 A2 * | 12/2000 | ............. F02D 41/02 |

* cited by examiner

SYSTEM AND METHOD FOR DETERMINING AN AMMONIA GENERATION RATE IN A THREE-WAY CATALYST

STATEMENT OF GOVERNMENT RIGHTS

This invention was produced pursuant to United States Government Program No. DE-EE0003379 with the Department of Energy (DoE). The U.S. Government has certain rights in this invention.

FIELD

The present disclosure relates to systems and methods for determining reaction rates in a three-way catalyst such as an ammonia generation rate.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Three-way and selective catalytic reduction (SCR) catalysts reduce emissions in exhaust from an engine. When the air/fuel ratio of the engine is rich or stoichiometric, the three-way catalyst reduces hydrocarbon, carbon monoxide, and nitrogen oxide and produces ammonia, and the SCR catalyst stores the ammonia. When the air/fuel ratio is lean, the three-way catalyst reduces hydrocarbon and carbon monoxide, and the ammonia stored in the SCR catalyst is used to reduce nitrogen oxide. Thus, the amount of ammonia stored in the SCR catalyst decreases when the air/fuel ratio is lean.

Typically, the air/fuel ratio is adjusted to lean to improve fuel economy. Passive SCR systems may switch the air/fuel ratio from lean to rich to increase ammonia storage levels in the SCR catalyst. Active SCR systems inject a dosing agent, such as urea, into exhaust to increase ammonia storage levels in the SCR catalyst. The dosing agent breaks down to form ammonia that is stored in the SCR catalyst.

SUMMARY

A system according to the principles of the present disclosure includes a rate determination module, a storage level determination module, and an air/fuel ratio control module. The rate determination module determines an ammonia generation rate in a three-way catalyst based on a reaction efficiency and a reactant level. The storage level determination module determines an ammonia storage level in a selective catalytic reduction (SCR) catalyst positioned downstream from the three-way catalyst based on the ammonia generation rate. The air/fuel ratio control module controls an air/fuel ratio of an engine based on the ammonia storage level.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Engine control systems may determine an ammonia storage level in a selective catalytic reduction (SCR) catalyst and control an air/fuel ratio of an engine based on the ammonia storage level. The ammonia storage level may be determined based on rates at which ammonia and nitrogen oxide are produced in a three-way catalyst (TWC) upstream from the SCR catalyst. These amounts may be determined based on ammonia levels and nitrogen oxide levels measured at an outlet of the TWC. However, measuring ammonia levels and nitrogen oxide levels at an outlet of a TWC requires one or more sensors, which may increase vehicle costs.

Mathematical models have been developed that estimate reaction rates in a TWC. However, these mathematical models are complex, requiring significant computation time and memory. Thus, these mathematical models may not be suitable for use in engine control systems onboard a vehicle that require real-time estimates of the ammonia and nitrogen oxide generation rates and have limited amounts of memory.

A control system and method according to the present disclosure determines rates of reactions in a TWC, including an ammonia generation rate, in a simplified way that requires less computation time and memory relative to existing methods. First, rates of reactions with oxygen as a reactant are determined. Second, a rate of a reaction with hydrocarbon as a reactant is determined based on the oxygen reaction rates. Third, rates of reactions with nitrogen oxide as a reactant are determined based on the oxygen reaction rate and the hydrocarbon reaction rate.

The reaction rates are determined based on reaction efficiencies, which may be determined in multiple steps. Base efficiencies may be determined based on an exhaust gas temperature and an amount of time that one or more reactants are present in the TWC, which may be referred to as a reaction period. The reaction efficiencies may be determined based on the base efficiencies and reactant levels in the TWC.

Determining TWC reaction rates in the manner described above reduces computation time and memory relative to existing methods, which enables real-time determination of the TWC reaction rates onboard a vehicle. In turn, an ammonia storage level in a SCR catalyst positioned downstream from the TWC may be determined based on the TWC reaction rates, and an air/fuel ratio of an engine may be controlled based on the ammonia storage level. In addition, the TWC reaction rates may be compared to predetermined criteria, and malfunctions of a TWC may be identified based on the comparison. Furthermore, determining the TWC reaction rates in the manner described above eliminates the need for a sensor that measures ammonia and nitrogen oxide levels at an outlet of a TWC, which decreases vehicle costs.

Figure 1:
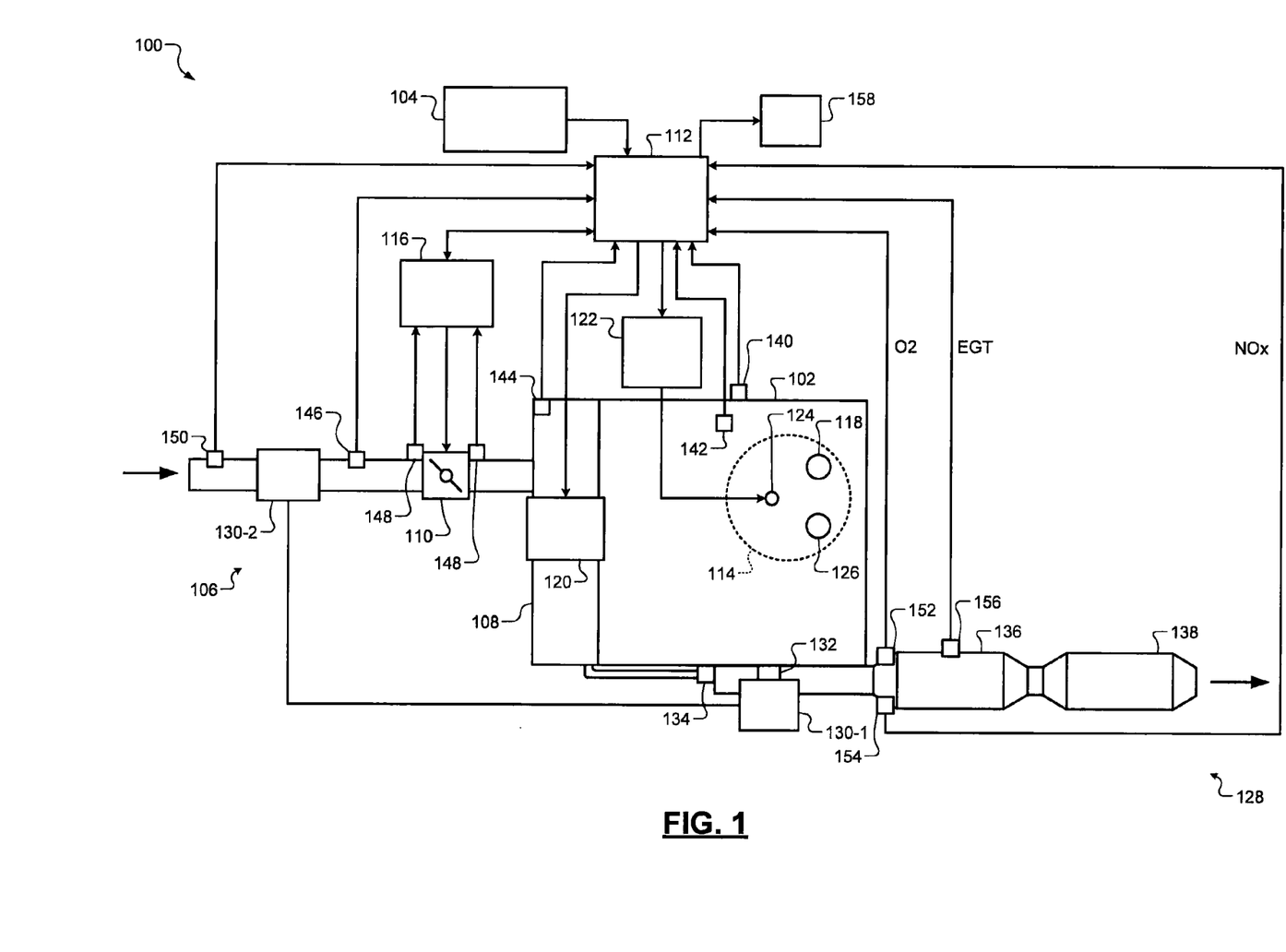
FIG. 1 is a functional block diagram of an example engine system according to the principles of the present disclosure.

Referring to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into the engine 102 through an intake system 106. For example only, the intake system 106 may include an intake manifold 108 and a throttle valve 110. For example only, the throttle valve 110 may include a butterfly valve having a rotatable blade. An engine control module (ECM) 112 controls a throttle actuator module 116, which regulates opening of the throttle valve 110 to control the amount of air drawn into the intake manifold 108.

Air from the intake manifold 108 is drawn into cylinders of the engine 102. While the engine 102 may include multiple cylinders, for illustration purposes a single representative cylinder 114 is shown. For example only, the engine 102 may include 2, 3, 4, 5, 6, 8, 10, and/or 12 cylinders. The ECM 112 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 114. Therefore, two crankshaft revolutions are necessary for the cylinder 114 to experience all four of the strokes.

During the intake stroke, air from the intake manifold 108 is drawn into the cylinder 114 through an intake valve 118. The ECM 112 controls a fuel actuator module 120, which regulates fuel injection to achieve a desired air/fuel ratio. Fuel may be injected into the intake manifold 108 at a central location or at multiple locations, such as near the intake valve 118 of each of the cylinders. In various implementations (not shown), fuel may be injected directly into the cylinders or into mixing chambers associated with the cylinders. The fuel actuator module 120 may halt injection of fuel to cylinders that are deactivated.

The injected fuel mixes with air and creates an air/fuel mixture in the cylinder 114. During the compression stroke, a piston (not shown) within the cylinder 114 compresses the air/fuel mixture. The engine 102 may be a compression-ignition engine, in which case compression in the cylinder 114 ignites the air/fuel mixture. Alternatively, the engine 102 may be a spark-ignition engine, in which case a spark actuator module 122 energizes a spark plug 124 in the cylinder 114 based on a signal from the ECM 112, which ignites the air/fuel mixture. The timing of the spark may be specified relative to the time when the piston is at its topmost position, referred to as top dead center (TDC).

The spark actuator module 122 may be controlled by a timing signal specifying how far before or after TDC to generate the spark. Because piston position is directly related to crankshaft rotation, operation of the spark actuator module 122 may be synchronized with crankshaft angle. In various implementations, the spark actuator module 122 may halt provision of spark to deactivated cylinders.

Generating the spark may be referred to as a firing event. The spark actuator module 122 may have the ability to vary the timing of the spark for each firing event. The spark actuator module 122 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 126. The byproducts of combustion are exhausted from the vehicle via an exhaust system 128.

The engine system 100 may include a boost device that provides pressurized air to the intake manifold 108. For example, FIG. 1 shows a turbocharger including a hot turbine 130-1 that is powered by hot exhaust gases flowing through the exhaust system 128. The turbocharger also includes a cold air compressor 130-2, driven by the turbine 130-1, which compresses air leading into the throttle valve 110. In various implementations, a supercharger (not shown), driven by the crankshaft, may compress air from the throttle valve 110 and deliver the compressed air to the intake manifold 108.

A wastegate 132 may allow exhaust to bypass the turbine 130-1, thereby reducing the boost (the amount of intake air compression) of the turbocharger. The ECM 112 may modulate the boost of the turbocharger by controlling the position of the wastegate 132. In various implementations, multiple turbochargers may be controlled by the ECM 112. The turbocharger may have variable geometry, which may be controlled by the ECM 112.

An intercooler (not shown) may dissipate some of the heat contained in the compressed air charge, which is generated as the air is compressed. The compressed air charge may also have absorbed heat from components of the exhaust system 128. Although shown separated for purposes of illustration, the turbine 130-1 and the compressor 130-2 may be attached to each other, placing intake air in close proximity to hot exhaust.

The engine system 100 may include an exhaust gas recirculation (EGR) valve 134, which selectively redirects exhaust gas back to the intake manifold 108. The EGR valve 134 may be located upstream of the turbocharger's turbine 130-1. The EGR valve 134 may be controlled by the ECM 112.

The exhaust system 128 includes a three-way catalyst (TWC) 136 and a selective catalytic reduction (SCR) catalyst 138. When the air/fuel ratio of the engine 102 is rich or stoichiometric, the TWC 136 reduces hydrocarbon, carbon monoxide, and nitrogen oxide and produces ammonia, and the SCR catalyst 138 stores the ammonia. When the air/fuel ratio is lean, the TWC 136 reduces hydrocarbon and carbon monoxide and the ammonia stored in the SCR catalyst 138 is used to reduce nitrogen oxide.

The position of the crankshaft may be measured using a crankshaft position (CPS) sensor 140. The ECM 112 may determine the speed of the crankshaft (i.e., the engine speed) based on the crankshaft position. The temperature of the engine coolant may be measured using an engine coolant temperature (ECT) sensor 142. The ECT sensor 142 may be located within the engine 102 or at other locations where the coolant is circulated, such as a radiator (not shown).

The pressure within the intake manifold 108 may be measured using a manifold absolute pressure (MAP) sensor 144. In various implementations, engine vacuum, which is the difference between ambient air pressure and the pressure within the intake manifold 108, may be measured. The mass flow rate of air flowing into the intake manifold 108 may be measured using a mass air flow (MAF) sensor 146. In various implementations, the MAF sensor 146 may be located in a housing that also includes the throttle valve 110. The throttle actuator module 116 may monitor the position of the throttle valve 110 using one or more throttle position sensors (TPS) 148. The ambient temperature of air being drawn into the engine 102 may be measured using an intake air temperature (IAT) sensor 150.

An oxygen level in exhaust gas from the engine 102 may be measured using an oxygen (O2) sensor 152. The O2 sensor 152 may be positioned upstream from the TWC 136 or at an inlet of the TWC 136. The ECM 112 may determine an air/fuel ratio of the engine based on the oxygen level. Nitrogen oxide and/or ammonia levels in exhaust gas from the engine 102 may be measured using a nitrogen oxide (NOx) sensor 154. The NOx sensor 154 may be positioned upstream from the TWC 136 or at the inlet of the TWC 136. The temperature of exhaust gas from the engine 102 may be measured using an exhaust gas temperature (EGT) sensor 156. The EGT sensor 156 may be positioned upstream from the TWC 136 or in the TWC 136.

The ECM 112 may use signals from the sensors to make control decisions for the engine system 100 and/or to identify a malfunction in the engine system 100. The ECM 112 may activate a malfunction indicator light (MIL) 158 to notify a driver of a malfunction in the engine system 100. Although the MIL 158 is referred to as a light, a medium other than light, such as sound or vibration, may be used to notify the driver. The ECM 112 may determine an ammonia generation rate in the TWC 136, determine an ammonia storage level in the SCR catalyst 138 based on the ammonia generation rate, and control an air/fuel ratio of the engine 102 based on the ammonia storage level.

Figure 2:
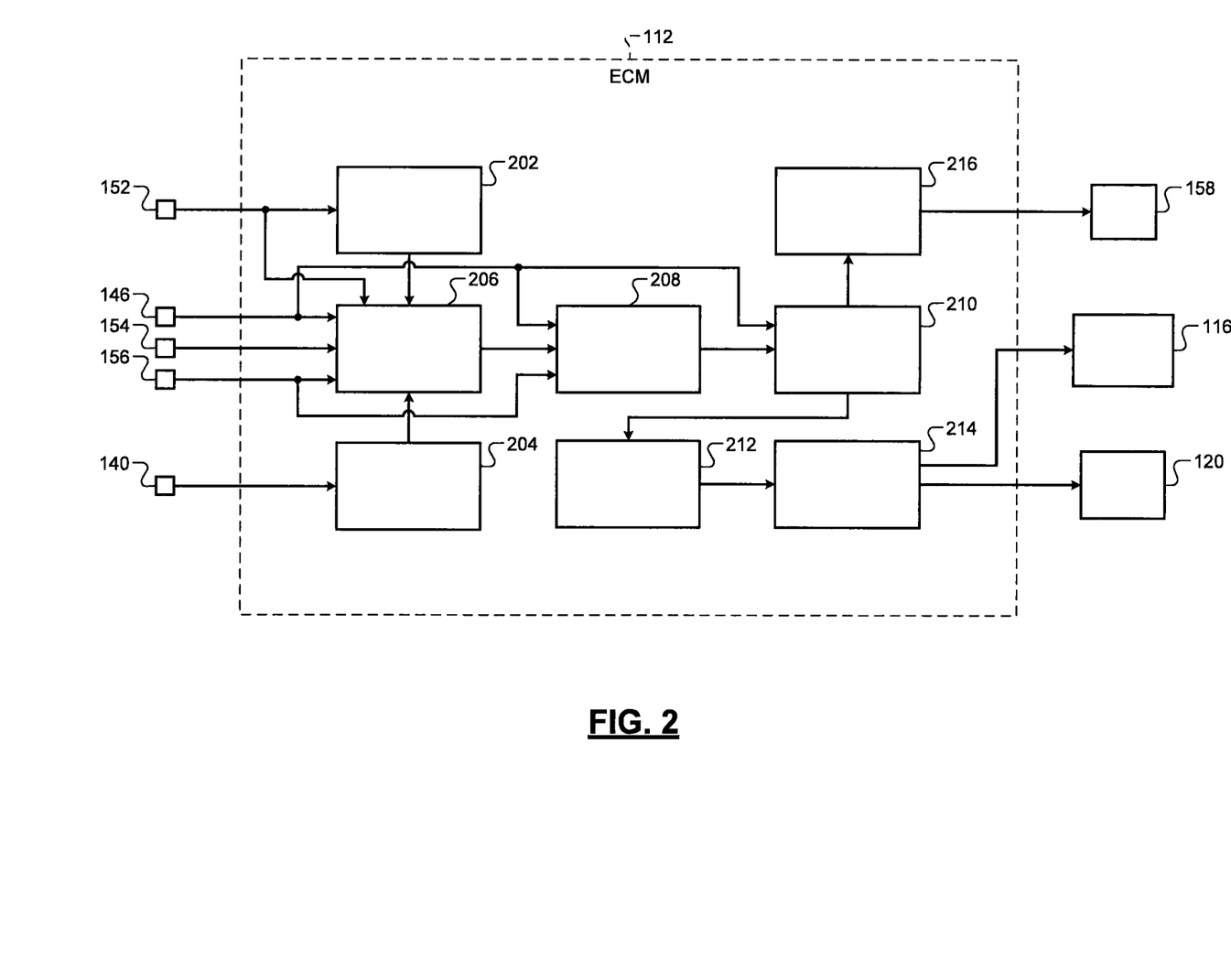
FIG. 2 is a functional block diagram of an example control system according to the principles of the present disclosure.

Referring to FIG. 2, the ECM 112 includes an air/fuel ratio (AFR) determination module 202, a speed determination module 204, and a reactant level determination module 206. The AFR determination module 202 determines an air/fuel ratio of the engine 102 based on input received from the O2 sensor 152. The speed determination module 204 determines the engine speed based on input received from the CPS sensor 140. The AFR determination module 202 outputs the air/fuel ratio and the speed determination module 204 outputs the engine speed.

The reactant level determination module 206 determines levels of reactants in the TWC 136 such as oxygen, carbon monoxide, hydrogen, hydrocarbon, nitrogen oxide, and ammonia. The reactant level determination module 206 may determine oxygen levels based on input received from the O2 sensor 152. The reactant level determination module 206 may determine carbon monoxide levels and hydrogen levels based on engine operating conditions such as the air/fuel ratio, the engine speed, an exhaust gas flow rate, and an exhaust gas temperature. The exhaust gas flow rate and the exhaust gas temperature may be determined based on input received from the MAF sensor 146 and the EGT sensor 156, respectively. The exhaust gas temperature may be increased based on an amount of heat released during reactions in the TWC 136.

The reactant level determination module 206 may determine nitrogen oxide levels and ammonia levels based on input received from the NOx sensor 154. The input received from the NOx sensor 154 may reflect the nitrogen oxide levels when the air/fuel ratio is lean and reflect the ammonia levels when the air/fuel ratio is rich. Alternatively, the reactant level determination module 206 may determine the nitrogen oxide levels and the ammonia levels based on the engine operating conditions.

An efficiency determination module 208 determines efficiencies of reactions in the TWC 136, such as the following seven reactions:

$$2CO + O_2 = 2CO_2; \tag{1}$$

$$2H_2 + O_2 = 2H_2O; \tag{2}$$

$$4HC + 5O_2 = 4CO_2 + 2H_2O; \tag{3}$$

$$4NH_3 + 5O_2 = 4NO + 6H_2O; \tag{4}$$

$$2HC + H_2O = 2CO + 3H_2; \tag{5}$$

$$2CO + 2NO = 2CO_2 + N_2; \text{ and} \tag{6}$$

$$5H_2 + 2NO = 2NH_3 + 2H_2O. \tag{7}$$

Due to the reactants involved, reactions (1) through (4) may be referred to as oxygen reactions, reaction (5) may be referred to as a hydrocarbon reaction, and reactions (6) and (7) may be referred to as nitrogen oxide reactions.

The efficiency determination module 208 may determine the reaction efficiencies based on the exhaust gas temperature, reactant levels, and a reaction period when reactants are present in the TWC 136. The efficiency determination module 208 may determine the reaction period based on the exhaust gas flow rate and a void volume of the TWC 136. The void volume of the TWC 136 is the total interior volume of the TWC 136 excluding the volume of the substrate in the TWC 136.

The efficiency determination module 208 may determine the reaction efficiencies based on a predetermined relationship between the exhaust gas temperature, the reaction period, the reactant levels, and the reaction efficiencies. The predetermined relationship may have four dimensions corresponding to the exhaust gas temperature, the reaction period, and the two reactant levels.

Figure 3:
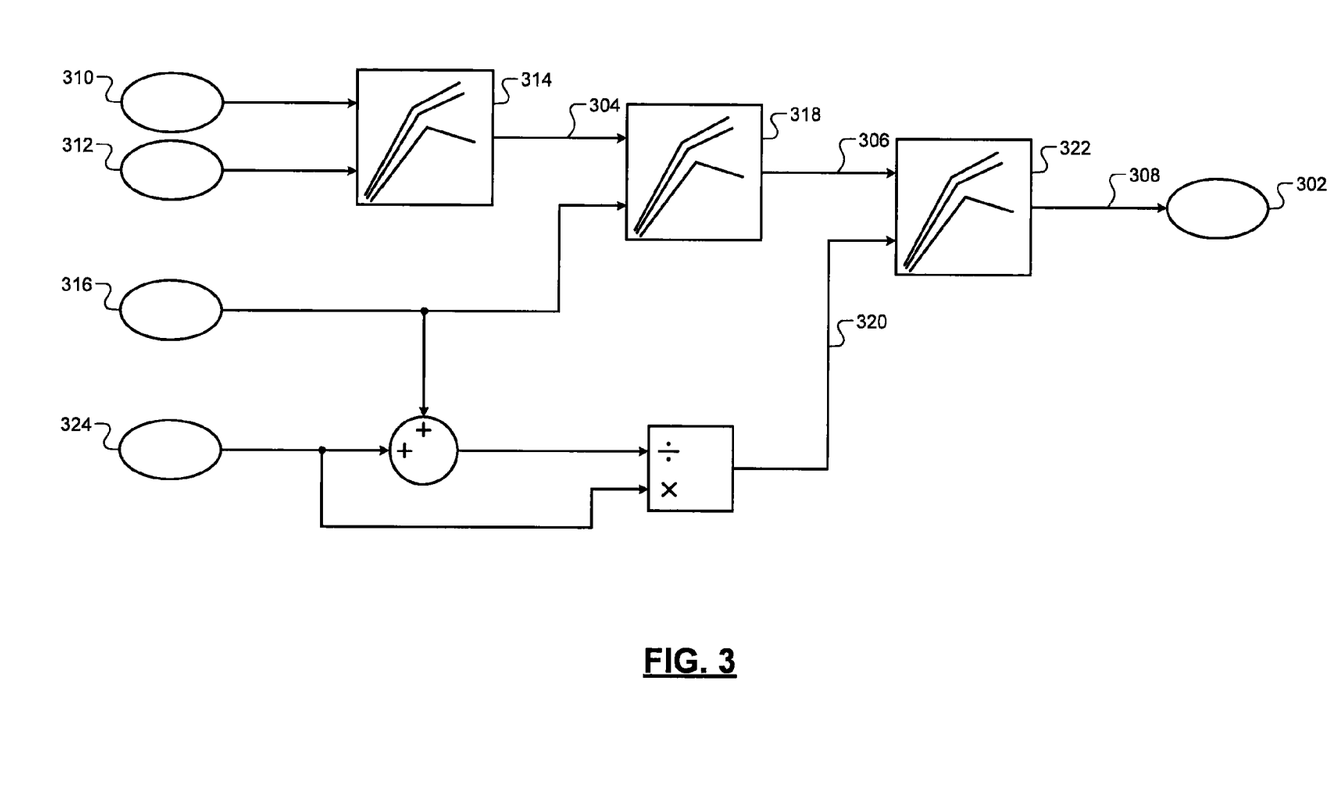
FIG. 3 is a schematic illustrating example operations performed by an efficiency determination module included in the example control system of FIG. 2.

With additional reference to FIG. 3, the efficiency determination module 208 may determine a reaction efficiency 302 in multiple steps to save computation time and memory. The efficiency determination module 208 may determine the reaction efficiency 302 based on a base or first efficiency 304, a second efficiency 306, and a third efficiency 308. The first efficiency 304 may be determined based on a first input 310, a second input 312, and a predetermined relationship 314 between the first input 310 and the second input 312. For example, the first input 310 may be the exhaust gas temperature and the second input 312 may be the reaction period. The predetermined relationship 314 may be embodied as an equation and/or as a lookup table and may have two dimensions corresponding to the first input 310 and the second input 312.

The second efficiency 306 may be determined based on the first efficiency 304, a third input 316, and a predetermined relationship 318 between the first efficiency 304, the third input 316, and the second efficiency 306. For example, for reaction (1), the third input 316 may be the oxygen level. The predetermined relationship 318 may be embodied as an equation and/or as a lookup table and may have two dimensions corresponding to the first efficiency 304 and the third input 316.

The third efficiency 308 may be determined based on the second efficiency 306, a ratio 320, and a predetermined relationship 322 between the second efficiency 306, the ratio 320, and the third efficiency 308. The ratio 320 is a ratio of a fourth input 324 to a sum of the third input 316 and the fourth input 324. For example, for reaction (1), the fourth input 324 may be the carbon monoxide level. The predetermined relationship 318 may be embodied as an equation and/or as a lookup table and may have two dimensions corresponding to the second efficiency 306 and the ratio 320.

The efficiency determination module 208 may determine that the reaction efficiency 302 is equal to the third efficiency 308. In this manner, the efficiency determination module 208 may determine an efficiency of a reaction in multiple steps using three two-dimensional relationships rather than one four-dimensional relationship. As a result, computation time and memory requirements may be reduced.

The efficiency determination module 208 may determine the efficiencies of reactions (2) through (4), (6), and (7) in a similar manner while making adjustments based on the different reactants. For reactions (2) through (4), the first input 310, the second input 312, and the third input 316 may be the same as the examples provided above for reaction (1), while the fourth input 324 may be different for each reaction. The fourth input 324 may be the hydrogen level for reaction (2), may be the hydrocarbon level for reaction (3), and may be the ammonia level for reaction (4).

For reactions (6) and (7), the first input 310 and the second input 312 may be the same as the examples provided above for reaction (1), while the third input 316 and the fourth input 324 may be different from reaction (1). The third input 316 may be the nitrogen oxide level for both reactions (6) and (7). The fourth input 324 may be the carbon monoxide level for reaction (6) and may be the hydrogen level for reaction (7).

The efficiency determination module 208 may determine the efficiency of reaction (5) based on the exhaust gas temperature, the reaction period, and a predetermined relationship between the exhaust gas temperature, the reaction period, and the efficiency. The predetermined relationship may be embodied as an equation and/or a lookup table. For simplicity, the efficiency of reaction (5) may be determined independent from the reactant levels, as water is typically abundant in the TWC 136.

Referring again to FIG. 2, the efficiency determination module 208 outputs the reaction efficiencies. A rate determination module 210 determines rates of reactions in the TWC 136, such as the seven reactions listed above. The rates of the seven reactions are related, as reactants and products of the seven reactions are the same in some instances. For example, hydrocarbon is a reactant in reactions (3) and (5), nitrogen oxide is a product in reaction (4) and is a reactant in reactions (6) and (7), and ammonia is a reactant in reaction (4) and is a product in reaction (7).

For simplicity, the rate determination module 210 may separate the seven reactions into subsets and determine a reaction rate for each subset sequentially rather than determining rates for all seven reactions at once. The rate determination module 210 may first determine the rate of reactions (1) through (4) (i.e., the oxygen reactions). Then, the rate of reaction (5) (i.e., the hydrocarbon reaction) may be determined. Next, the rate of reactions (6) and (7) (i.e., the nitrogen oxide reactions) may be determined. The rate determination module 210 may assume that the oxygen reactions are significantly faster than the hydrocarbon reaction or the nitrogen oxide reactions. Reactions (1) through (4) may be referred to as a first reaction, and the rate of reactions (1) through (4) may be referred to as a first reaction rate.

The rate determination module 210 may determine the reaction rates based on the reactant levels, a reaction stoichiometry, the reaction efficiency, and the exhaust gas flow rate. The rate determination module 210 may determine the amounts of reactants consumed and products generated based on the reactant levels, the reaction stoichiometry, and the reaction efficiency. The rate determination module 210 may multiply these amounts by the exhaust gas flow rate to obtain the reaction rates. The rate determination module 210 may account for changes in the reactant levels due to other reactions in a subset by allocating portions of the reactant levels to each reaction.

For example, regarding the oxygen reactions, the amount of oxygen available in the TWC 136 may be limited. Thus, the amount of oxygen consumed by one of the oxygen reactions may affect the rates of the other oxygen reactions. Therefore, the rate determination module 210 may determine the rates of the oxygen reactions using the same initial oxygen level while allocating portions of the oxygen level to each oxygen reaction. The rate determination module 210 may accomplish this by determining the consumption amounts of the reactants other than oxygen using the following equations:

$$[CO]_c = [CO]_i \eta_{(1)} - [CO]_i (1-\eta_{(1)}) \max\left(0, \frac{\frac{1}{2}[CO]_i \eta_{(1)} + \frac{1}{2}[H_2]_i \eta_{(2)} + \frac{5}{4}[HC]_i \eta_{(3)} + \frac{5}{4}[NH_3]_i \eta_{(4)} - [O_2]_i}{\frac{1}{2}[CO]_i(1-\eta_{(1)}) + \frac{1}{2}[H_2]_i(1-\eta_{(2)}) + \frac{5}{4}[HC]_i(1-\eta_{(3)}) + \frac{5}{4}[NH_3]_i(1-\eta_{(4)})}\right); \quad (8)$$

$$[H_2]_c = [H_2]_i \eta_{(2)} - \qquad (9)$$

$$[H_2]_i(1-\eta_{(2)})\max\left(0, \frac{\frac{1}{2}[CO]_i \eta_{(1)} + \frac{1}{2}[H_2]_i \eta_{(2)} + \frac{5}{4}[HC]_i \eta_{(3)} + \frac{5}{4}[NH_3]_i \eta_{(4)} - [O_2]_i}{\frac{1}{2}[CO]_i(1-\eta_{(1)}) + \frac{1}{2}[H_2]_i(1-\eta_{(2)}) + \frac{5}{4}[HC]_i(1-\eta_{(3)}) + \frac{5}{4}[NH_3]_i(1-\eta_{(4)})}\right);$$

$$[HC]_c = [HC]_i \eta_{(3)} - \qquad (10)$$

$$[HC]_i(1-\eta_{(3)})\max\left(0, \frac{\frac{1}{2}[CO]_i \eta_{(1)} + \frac{1}{2}[H_2]_i \eta_{(2)} + \frac{5}{4}[HC]_i \eta_{(3)} + \frac{5}{4}[NH_3]_i \eta_{(4)} - [O_2]_i}{\frac{1}{2}[CO]_i(1-\eta_{(1)}) + \frac{1}{2}[H_2]_i(1-\eta_{(2)}) + \frac{5}{4}[HC]_i(1-\eta_{(3)}) + \frac{5}{4}[NH_3]_i(1-\eta_{(4)})}\right);$$

and $$[NH3]_c = [NH3]_i \eta_{(4)} - \qquad (11)$$

$$[NH3]_i(1-\eta_{(4)})\max\left(0, \frac{\frac{1}{2}[CO]_i \eta_{(1)} + \frac{1}{2}[H_2]_i \eta_{(2)} + \frac{5}{4}[HC]_i \eta_{(3)} + \frac{5}{4}[NH_3]_i \eta_{(4)} - [O_2]_i}{\frac{1}{2}[CO]_i(1-\eta_{(1)}) + \frac{1}{2}[H_2]_i(1-\eta_{(2)}) + \frac{5}{4}[HC]_i(1-\eta_{(3)}) + \frac{5}{4}[NH_3]_i(1-\eta_{(4)})}\right).$$

$[CO]_c$ is the amount of carbon monoxide consumed, $[H_2]_c$ is the amount of hydrogen consumed, $[HC]_c$ is the amount of hydrocarbon consumed, and $[NH_3]_c$ is the amount of ammonia consumed. $[CO]_i$ is the initial carbon monoxide level, $[H_2]_i$ is the initial hydrogen level, $[HC]_i$ is the initial hydrocarbon level, and $[NH_3]_i$ is the initial ammonia level. $\eta_{(1)}$ is the efficiency of reaction (1), $\eta_{(2)}$ is the efficiency of reaction (2), $\eta_{(3)}$ is the efficiency of reaction (3), and $\eta_{(4)}$ is the efficiency of reaction (4).

The rate determination module 210 may determine the amounts of oxygen consumed and products generated in the oxygen reactions based on the consumption amounts determined above and the reaction stoichiometries. The rate determination module 210 may determine a reaction rate for each reactant and each product based on the reactant consumption amounts and the product generation amounts, respectively, and the exhaust gas flow rate. Reaction rates of the reactants and the products may be referred to as consumption rates and generation rates, respectively.

In another example, regarding the nitrogen oxide reactions, the amount of nitrogen oxide available in the TWC 136 may be limited. Thus, the amount of nitrogen oxide consumed by one of the nitrogen oxide reactions may affect the rates of the other nitrogen oxide reactions. Therefore, the rate determination module 210 may determine the rates of the nitrogen oxide reactions using the same initial nitrogen oxide level while allocating portions of the nitrogen oxide level to each nitrogen oxide reaction. The rate determination module 210 may accomplish this by determining the consumption amounts of the reactants other than nitrogen oxide using the following equations:

$$[CO]_c = [CO]_i \eta_{(6)} - \qquad (12)$$

$$[CO]_i(1-\eta_{(6)})\max\left(0, \frac{[CO]_i \eta_{(6)} + \frac{2}{5}[H_2]_i \eta_{(7)} - [NO]_i}{[CO]_i(1-\eta_{(6)}) + \frac{2}{5}[H_2]_i(1-\eta_{(7)})}\right);$$

and $$[H_2]_c = [H_2]_i \eta_{(7)} - \qquad (13)$$

$$[H_2]_i(1-\eta_{(7)})\max\left(0, \frac{[CO]_i \eta_{(6)} + \frac{2}{5}[H_2]_i \eta_{(7)} - [NO]_i}{[CO]_i(1-\eta_{(6)}) + \frac{2}{5}[H_2]_i(1-\eta_{(7)})}\right).$$

$[NO]_i$ is the initial nitrogen oxide level, $\eta_{(6)}$ is the efficiency of reaction (6), and $\eta_{(7)}$ is the efficiency of reaction (7).

The rate determination module 210 may determine the amount of nitrogen oxide consumed and the amounts of products generated in the nitrogen oxide reactions based on the consumption amounts determined above and the reaction stoichiometries. The rate determination module 210 may determine a reaction rate for each reactant and each product based on the reactant consumption amounts and the product generation amounts, respectively, and the exhaust gas flow rate. In this manner, the rate determination module 210 may determine an ammonia generation rate in the TWC.

The rate determination module 210 may determine the rate of the oxygen reactions and adjust the levels of the reactants and products involved in the oxygen reactions before determining the rate of the hydrogen reaction. The rate determination module 210 may determine the amount of oxygen consumed and the amount of nitrogen oxide generated in the oxygen reactions as described above. The rate determination module 210 may multiply the oxygen consumption amount and the nitrogen oxide generation amount by the exhaust gas flow rate to obtain an oxygen consumption rate and a nitrogen oxide generation rate, respectively.

The rate determination module 210 may determine the rate of the hydrogen reaction based on the hydrocarbon level, the reaction stoichiometry, the reaction efficiency, and the exhaust gas flow rate. The rate determination module 210 may determine the amount of hydrocarbon consumed in the hydrocarbon reaction based on the hydrocarbon level and the reaction stoichiometry. The rate determination module 210 may multiply this amount by the exhaust gas flow rate to obtain a hydrocarbon consumption rate.

The rate determination module 210 may determine the rate of the hydrocarbon reaction and adjust the levels of the reactants and products involved in the hydrocarbon reaction before determining the rate of the nitrogen oxide reactions. The rate determination module 210 may determine the amount of ammonia produced in the nitrogen oxide reactions as described above. The rate determination module 210 may multiply this amount by the exhaust gas flow rate to obtain an ammonia generation rate. The rate determination module 210 outputs the reaction rates.

A storage level determination module 212 determines an ammonia storage level in the SCR catalyst 138 based on the nitrogen oxide generation rate and the ammonia generation rate. The storage level determination module 212 decreases the ammonia storage level based on the nitrogen oxide generation rate and increases the ammonia storage level based on the ammonia generation rate. The ammonia storage level may be set to zero when a vehicle is manufactured and manually reset to zero when the vehicle is serviced, such as when the SCR catalyst 138 is replaced. The storage level determination module 212 outputs the ammonia storage level.

An air/fuel ratio (AFR) control module 214 controls the air/fuel ratio of the engine 102 based on the ammonia storage level. The AFR control module 214 may control the air/fuel ratio by controlling the throttle actuator module 116 to regulate intake airflow and/or controlling the fuel actuator module 120 to regulate fuel injection. The AFR control module 214 may adjust the air/fuel ratio to rich when the ammonia storage level is less than a first level and adjust the air/fuel ratio to lean when the ammonia storage level is greater than a second level. The first level and the second level may be predetermined and/or may be equal to or different from each other.

A catalyst diagnostic module 216 identifies malfunctions of the TWC 136 based on the reaction rates. The catalyst diagnostic module 216 may identify a malfunction in the TWC 136 when the ammonia generation rate is less than a first rate. The catalyst diagnostic module 216 may identify a malfunction in the TWC 136 when the nitrogen oxide generation rate is less than a second rate. The first rate and the second rate may be predetermined and/or may be based on the exhaust gas flow rate, the exhaust gas temperature, and/or the reactant levels. The catalyst diagnostic module 216 may activate the MIL 158 when a malfunction of the TWC 136 is identified.

Figure 4:
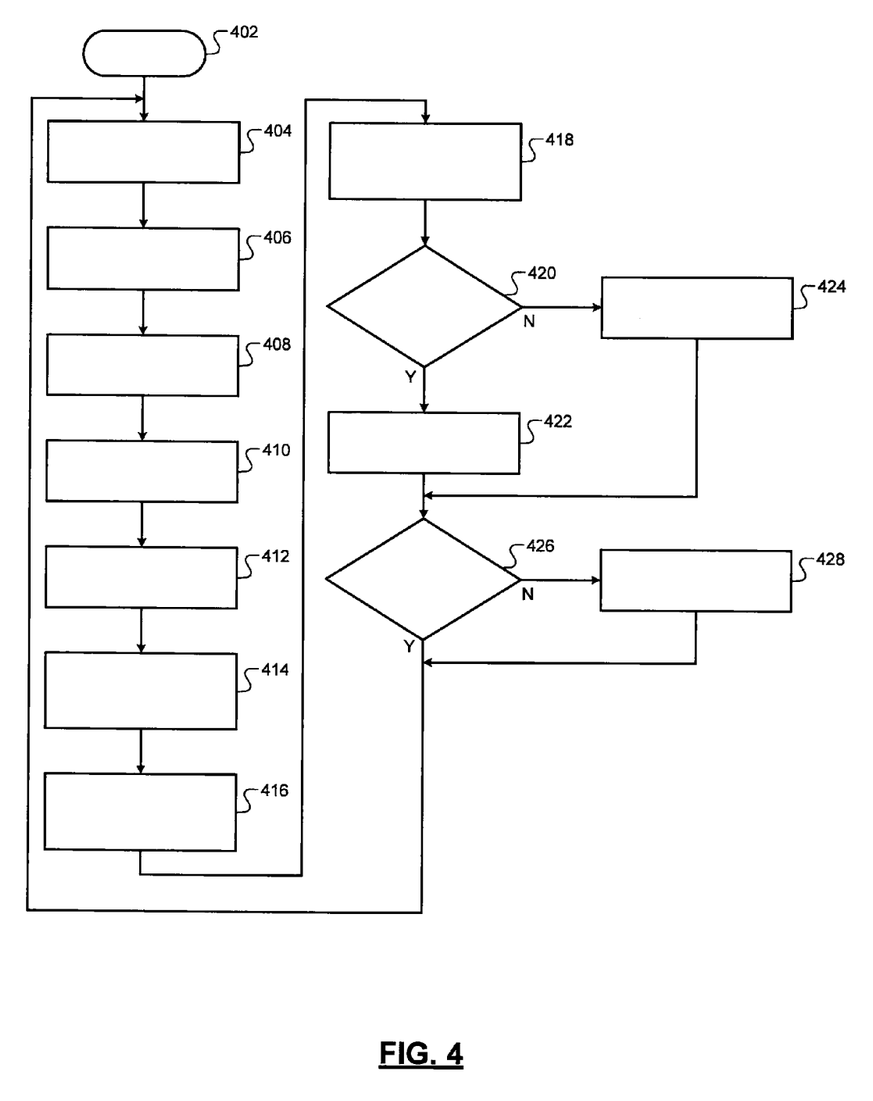
FIG. 4 is a flowchart illustrating an example method according to the principles of the present disclosure.

Referring to FIG. 4, a method for determining reaction rates in a three-way catalyst (TWC), such as an ammonia generation rate, begins at 402. At 404, the method determines levels of reactants such as those in reactions (1) through (7). The method may determine the reactant levels based on measured levels and/or engine operating conditions. The engine operating conditions may include an engine air/fuel ratio, an engine speed, an exhaust gas flow rate, and/or an exhaust gas temperature.

At 406, the method determines efficiencies of the oxygen reactions in the TWC. The method may determine the efficiency of each oxygen reaction based on a first efficiency, a second efficiency, and a third efficiency. The method may determine the first efficiency based on the exhaust gas temperature, a reaction period, and a predetermined relationship between the exhaust gas temperature, the reaction period, and the first efficiency. The reaction period is the amount of time that one or more reactants are present in the TWC, which may be determined based on the exhaust gas flow rate and the void volume of the TWC.

The method may determine the second efficiency based on the first efficiency, an oxygen level in the TWC, and a predetermined relationship between the first efficiency, the oxygen level, and the second efficiency. The method may determine the third efficiency based on the second efficiency, an oxygen ratio, and predetermined relationship between the second efficiency, the oxygen ratio, and the third efficiency. The oxygen ratio is the ratio of the oxygen level to a sum of the oxygen level and the level of the reactant other than oxygen involved in the oxygen reaction. The method may set the efficiency of each oxygen reaction equal to the third efficiency.

At 408, the method determines rates of the oxygen reactions. The method may determine reactant consumption rates and product generation rates based on reactant consumption amounts and product generation amounts, respectively, and the exhaust gas flow rate. The method may determine consumption amounts of reactants other than oxygen based on the reactant levels and the reaction efficiencies. The method may determine the amount of oxygen consumed and the amounts of products generated based on these consumption amounts and reaction stoichiometries. The method may allocate a portion of the oxygen level to each oxygen reaction by, for example, determining rates of the oxygen reactions using equations (8) through (11).

At 410, the method determines efficiency of the hydrocarbon reaction in the TWC. The method may adjust the reactant levels based on the reactant consumption amounts and the product generation amounts of the oxygen reactions before determining the efficiency of the hydrocarbon reaction. The method may determine the efficiency of the hydrocarbon reaction based on exhaust gas temperature and the reaction period.

At 412, the method determines the rate of the hydrocarbon reaction in the TWC. The method may determine reaction rates of each reactant and each product in the hydrocarbon reaction based on reactant consumption amounts and product generation amounts, respectively, and the exhaust gas flow rate. The method may determine the reactant consumption amounts and the product generation amounts based on the reactant levels, the reaction stoichiometry, and the reaction efficiency.

At 414, the method determines efficiencies of the nitrogen oxide reactions in the TWC. The method may adjust the reactant levels based on the consumption amounts and the generation amounts of the hydrocarbon reaction before determining the efficiency of the hydrocarbon reaction. The method may determine the efficiency of each nitrogen oxide reaction based on the first efficiency used to determine the efficiency of each oxygen reaction, a second efficiency, and a third efficiency. The method may determine the second efficiency based on the first efficiency, a nitrogen oxide level in the TWC, and a predetermined relationship between the first efficiency, the nitrogen oxide level, and the second efficiency.

The method may determine the third efficiency based on the second efficiency, a nitrogen oxide ratio, and a predetermined relationship between the second efficiency, the nitrogen oxide ratio, and the third efficiency. The nitrogen oxide ratio is the ratio of the nitrogen oxide level to a sum of the nitrogen oxide level and a level of a reactant other than nitrogen oxide involved in the nitrogen oxide reaction. The method may set the efficiency of each nitrogen oxide reaction equal to the third efficiency.

At 416, the method determines rates of the nitrogen oxide reactions. The method may determine reactant consumption rates and product generation rates based on reactant consumption amounts and product generation amounts, respectively, and the exhaust gas flow rate. The method may determine consumption amounts of reactants other than nitrogen oxide based on the reactant levels and the reaction efficiencies. The method may determine the amount of nitrogen oxide consumed and the amounts of products generated based on these consumption amounts and reaction stoichiometries. The method may allocate a portion of the nitrogen oxide level to each nitrogen oxide reaction by, for example, determining rates of the nitrogen oxide reactions using equations (12) and (13).

At 418, the method determines an ammonia storage level in a selective catalytic reduction (SCR) catalyst. The method may determine the ammonia storage level based on a nitrogen oxide generation rate determined at 408 and an ammonia generation rate determined at 416. The method may decrease the ammonia storage level based on the nitrogen oxide generation rate and increase the ammonia storage level based on the ammonia generation rate.

At 420, the method determines whether the ammonia storage level is greater than a predetermined level. If 420 is true, the method continues at 422. If 420 is false, the method continues at 424. At 422, the method adjusts fueling to yield a lean air/fuel ratio. At 424, the method adjusts fueling to yield a rich air/fuel ratio. In this manner, the method balances between minimizing fuel consumption and minimizing emission levels.

At 426, the method determines whether one or more reaction rates of the TWC are greater than predetermined rates. The predetermined rates may be based on the exhaust gas temperature, the reaction period, and/or the reactant levels. If 426 is true, the method continues at 404. If 426 is false, the method continues at 428. At 428, the method identifies a malfunction of the TWC. The method may also activate a malfunction indicator light (MIL) or the like and/or set a diagnostic trouble code (DTC). This ensures that the TWC is repaired or replaced to maintain emission reduction rates.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a first electronic circuit configured to:
      determine an amount consumed of a reactant other than nitrogen oxides in a three-way catalyst based on a reaction efficiency and a reactant level; and
      determine an ammonia generation rate in the three-way catalyst based on the reactant amount consumed;
   a second electronic circuit configured to determine an ammonia storage level in a selective catalytic reduction (SCR) catalyst based on the ammonia generation rate, wherein the SCR catalyst is positioned downstream from the three-way catalyst; and
   a third electronic circuit configured to control an air/fuel ratio of an engine based on the ammonia storage level.

2. The system of claim 1 further comprising a fourth electronic circuit configured to identify a malfunction of the three-way catalyst based on the ammonia generation rate.

3. The system of claim 1 further comprising a fourth electronic circuit configured to determine the reactant level based on an operating condition of the engine.

4. The system of claim 1 further comprising a fourth electronic circuit configured to determine the reaction efficiency based on an exhaust gas temperature, a reaction period when a reactant is present in the three-way catalyst, and the reactant level.

5. The system of claim 4 wherein the fourth electronic circuit is configured to determine a base efficiency based on the exhaust gas temperature and the reaction period, and determine the reaction efficiency based on the base efficiency and the reactant level.

6. The system of claim 1 wherein the first electronic circuit is configured to determine a first rate of a first reaction based on a first efficiency of the first reaction and an oxygen level in the three-way catalyst.

7. The system of claim 6 wherein the first reaction includes four reactions and the first electronic circuit is configured to determine the first rate based on a carbon monoxide level, a hydrogen level, a hydrocarbon level, and an ammonia level in the three-way catalyst.

8. The system of claim 6 wherein the first electronic circuit is configured to determine a second rate of a second reaction based on a second efficiency of the second reaction, a hydrocarbon level in the three-way catalyst, and the first rate.

9. The system of claim 8 wherein the first electronic circuit is configured to determine a third rate of a third reaction based on a third efficiency of the third reaction, a nitrogen oxide level in the three-way catalyst, and the second rate.

10. The system of claim 9 wherein the third reaction includes two reactions and the first electronic circuit is configured to determine the third rate based on a carbon monoxide level and a hydrogen level in the three-way catalyst.

11. The system of claim 1 wherein the first, second, and third electronic circuits are included in at least one of an Application Specific Integrated Circuit (ASIC), a combinational logic circuit, a field programmable gate array (FPGA), and a processor.

12. A method comprising:
    determining an amount consumed of a reactant other than nitrogen oxides in a three-way catalyst based on a reaction efficiency and a reactant level;
    determining an ammonia generation rate in the three-way catalyst based on the reactant amount consumed;
    determining an ammonia storage level in a selective catalytic reduction (SCR) catalyst based on the ammonia generation rate, wherein the SCR catalyst is positioned downstream from the three-way catalyst; and
    controlling an air/fuel ratio of an engine based on the ammonia storage level.

13. The method of claim 12 further comprising identifying a malfunction of the three-way catalyst based on the ammonia generation rate.

14. The method of claim 12 further comprising determining the reactant level based on an operating condition of the engine.

15. The method of claim 12 further comprising determining the reaction efficiency based on an exhaust gas temperature, a reaction period when a reactant is present in the three-way catalyst, and the reactant level.

16. The method of claim 15 further comprising:
    determining a base efficiency based on the exhaust gas temperature and the reaction period; and
    determining the reaction efficiency based on the base efficiency and the reactant level.

17. The method of claim 12 further comprising determining a first rate of a first reaction based on a first efficiency of the first reaction and an oxygen level in the three-way catalyst.

18. The method of claim 17 wherein the first reaction includes four reactions, the method further comprising determining the first rate based on a carbon monoxide level, a hydrogen level, a hydrocarbon level, and an ammonia level in the three-way catalyst.

19. The method of claim 17 further comprising determining a second rate of a second reaction based on a second efficiency of the second reaction, a hydrocarbon level in the three-way catalyst, and the first rate.

20. The method of claim 19 further comprising determining a third rate of a third reaction based on a third efficiency of the third reaction, a nitrogen oxide level in the three-way catalyst, and the second rate.

21. The method of claim 20 wherein the third reaction includes two reactions, the method further comprising determining the third rate based on a carbon monoxide level and a hydrogen level in the three-way catalyst.

* * * * *